US007997779B2

(12) United States Patent
Futami

(10) Patent No.: US 7,997,779 B2
(45) Date of Patent: Aug. 16, 2011

(54) VEHICLE LAMP UNIT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 194 days.

(21) Appl. No.: 12/205,849

(22) Filed: Sep. 5, 2008

(65) Prior Publication Data

US 2009/0067186 A1 Mar. 12, 2009

(30) Foreign Application Priority Data

Sep. 7, 2007 (JP) ................................ 2007-233115

(51) Int. Cl.

| | |
|---|---|
| ***B60Q 1/04*** | (2006.01) |
| ***F21V 7/09*** | (2006.01) |
| ***F21V 5/04*** | (2006.01) |
| ***F21S 8/10*** | (2006.01) |

(52) U.S. Cl. ........ 362/539; 362/518; 362/545; 362/548; 362/521

(58) Field of Classification Search .................. 362/297, 362/346, 516–518, 520, 538, 539, 521–522
See application file for complete search history.

(56) References Cited

U.S. PATENT DOCUMENTS

| | | | | |
|---|---|---|---|---|
| 5,339,226 | A * | 8/1994 | Ishikawa | 362/539 |
| 6,152,589 | A * | 11/2000 | Kawaguchi et al. | 362/518 |
| 6,698,912 | B2 * | 3/2004 | Yang | 362/516 |
| 6,921,188 | B2 * | 7/2005 | Taniuchi | 362/517 |
| 6,951,416 | B2 | 10/2005 | Sazuka et al. | |
| 7,008,094 | B2 * | 3/2006 | Taniuchi | 362/539 |
| 7,168,832 | B2 | 1/2007 | Komatsu et al. | |
| 7,255,467 | B2 * | 8/2007 | Ishida et al. | 362/520 |
| 7,334,926 | B2 * | 2/2008 | Takada | 362/517 |
| 7,407,310 | B2 * | 8/2008 | Komatsu | 362/509 |
| 7,445,366 | B2 * | 11/2008 | Tsukamoto et al. | 362/538 |
| 7,452,115 | B2 * | 11/2008 | Alcelik | 362/516 |
| 7,484,868 | B2 * | 2/2009 | Oyama | 362/517 |
| 7,775,699 | B2 * | 8/2010 | Fallahi et al. | 362/539 |
| 2001/0043475 | A1 * | 11/2001 | Natsume | 362/516 |
| 2007/0047250 | A1 * | 3/2007 | Kinoshita | 362/539 |
| 2007/0082577 | A1 * | 4/2007 | Tajima | 445/66 |

FOREIGN PATENT DOCUMENTS

| | | |
|---|---|---|
| CN | 1661275 A | 8/2005 |
| FR | 2844031 | 3/2004 |
| JP | 2006-302778 A | 11/2006 |

OTHER PUBLICATIONS

Chinese Office Action for Chinese Patent Application No. 200810215345.3 dated May 18, 2011, along with English translation thereof.

* cited by examiner

*Primary Examiner* — Jong-Suk (James) Lee
*Assistant Examiner* — Stanley Weinberg
(74) *Attorney, Agent, or Firm* — Kenealy Vaidya LLP

(57) ABSTRACT

In a vehicle lamp unit that is configured to be mounted on a vehicle, a semiconductor light source can be substantially covered with a first reflector and, therefore, the semiconductor light source is not visually observable (or, is difficult to see) from outside the lamp unit even when a projection lens is disposed in front of the opening of the first reflector and spaced from the first reflector so as not to contact the first reflector. Thus, a vehicle lamp unit having a novel design can be provided in which the projection lens appears as if it is floating in air and in which the semiconductor light source is not visually seen or is difficult to be seen from the outside.

13 Claims, 11 Drawing Sheets

VEHICLE LAMP UNIT

This application claims the priority benefit under 35 U.S.C. §119 of Japanese Patent Application No. 2007-233115 filed on Sep. 7, 2007, which is hereby incorporated in its entirety by reference.

BACKGROUND

1. Technical Field

The disclosed subject matter relates to a vehicle lamp unit and, more particularly, a vehicle lamp unit having a projection lens configured such that it appears as if the projection lens is floating in air.

2. Description of the Related Art

A direct-projection-type vehicle lamp unit is known which causes light from a semiconductor light source or a light emitting diode (LED) to directly enter a projection lens without being reflected by a reflector (for example, as described in Japanese Patent Application Laid-Open No. 2004-95479).

The vehicle lamp described in Japanese Patent Application Laid-Open No. 2004-95479 has, as shown in FIG. 11, an LED 10', which is a semiconductor light source, a projection lens 20' disposed in front of a light emitting surface 10*a'* of the LED 10', and a shade 30' disposed between the LED 10' and the projection lens 20'. A portion of light emitted from the LED 10' enters the projection lens 20' to be projected forward, while another portion of the light is blocked by the shade 30'.

SUMMARY

In recent years, there has been a demand for vehicle lamps having novel design characteristics from the viewpoint of heightening the flexibility in vehicle design and so on. One such vehicle lamp is the vehicle lamp of the direct-projection-type described in Japanese Patent Application Laid-Open No. 2004-95479 in which a projection lens is disposed such that it appears as if it is floating in air.

A direct-projection-type vehicle lamp of this kind, however, has a problem in that if a projection lens is disposed such that it appears as if it is floating in air, a semiconductor light source can be visually observed from the outside through the space between the projection lens and the semiconductor light source, which may be undesirable in terms of design.

In addition, a direct-projection-type vehicle lamp of this kind has another problem in that only a portion of light emitted from the semiconductor light source enters the projection lens and, therefore, the use efficiency of light is low.

According to an aspect of the disclosed subject matter a vehicle lamp unit can be provided with a novel design configured so that a semiconductor light source cannot be visually seen (or is difficult to be observed) from the outside. A projection lens can also be disposed such that it appears as if it is floating in air.

According to another aspect of the disclosed subject matter a vehicle lamp unit can be configured to effectively utilize light which is emitted from a semiconductor light, but which does not enter a projection lens.

According to another aspect of the disclosed subject matter, a vehicle lamp unit can include: a semiconductor light source; a first reflector having a reflecting surface for reflecting a light emitted from the semiconductor light source, the first reflector being disposed in front of a light emitting surface of the semiconductor light source while setting the reflecting surface in opposition to the light emitting surface of the semiconductor light source, having an opening formed at a position on an optical axis to allow passage of the light emitted from the semiconductor light source, and covering the semiconductor light source; a second reflector having reflecting surfaces respectively disposed on both sides of the semiconductor light source; and a first projection lens disposed in such a position in front of the opening of the first reflector as not to contact with the first reflector, the first projection lens for projecting forward the light passing through the opening of the first reflector in the light emitted from the semiconductor light source, wherein the reflecting surface of the first reflector is formed so as to reflect, toward each of the reflecting surfaces of the second reflector, portions of the light not passing through the opening of the first reflector in the light emitted from the semiconductor light source, and the reflecting surfaces of the second reflector are formed so as to reflect forward the light reflected by the reflecting surface of the first reflector in the light emitted from the semiconductor light source.

The semiconductor light source can be covered with the first reflector and, therefore, the semiconductor light source is not visually observable (or is difficult to be seen) from the outside even when the projection lens is disposed in a position in front of the opening of the first reflector so as not to contact the first reflector (that is, even when the projection lens is disposed as if it is floating in air). That is, according to this aspect of the disclosed subject matter, a vehicle lamp unit having a novel design can be provided in which the projection lens is disposed such that it appears as if it is floating in air and in which the semiconductor light source is not visually observable or is difficult to be seen from the outside.

Also, according to this aspect of the disclosed subject matter, light that does not pass through the opening of the first reflector (i.e., the light not incident on the projection lens of the light emitted from the semiconductor light source) is reflected by the reflecting surface of the first reflector and the reflecting surfaces of the second reflector to travel forward. Thus, effective use of the light that is not incident on the projection lens of the light emitted from the semiconductor light source can be achieved.

Also, the opening for passing light emitted from the semiconductor light source is formed in the first reflector which covers the semiconductor light source. Therefore, even though light emission from the semiconductor light source is accompanied by generation of heat, the heat can be released by radiation through the opening.

Further, the projection lens can be disposed in such a position in front of the opening of the first reflector so as not to contact the first reflector and, therefore, is free from the influence of heat generation accompanying light emission from the semiconductor light source, so that the desired luminous intensity distribution pattern can be obtained.

According to a second aspect of the disclosed subject matter, the vehicle lamp unit according to the first aspect of the disclosed subject matter can further include a projection lens attachment leg having one end to which the first projection lens is fixed and another end fixed on a side of the first reflector, wherein the first projection lens is disposed in such a position in front of the opening of the first reflector so as not to contact the first reflector by fixing the other end of the projection lens attachment leg on the side of the first reflector. According to the second aspect of the disclosed subject matter, the projection lens attachment leg enables the first projection lens to be easily disposed in a position in front of the opening of the first reflector so as not to contact the first reflector.

In addition, according to the second aspect of the disclosed subject matter, even a first projection lens which has a different focal length can be easily disposed in a predetermined position in front of the opening of the first reflector so as not to contact the first reflector by adjusting the length of the projection lens attachment leg along the optical axis direction.

According to a third aspect of the disclosed subject matter, in the vehicle lamp unit, the reflecting surface of the first reflector comprises a pair of ellipsoidal reflecting surfaces disposed adjacent to each other. The reflecting surfaces of the second reflector can include paraboloidal reflecting surfaces respectively disposed on both sides of the semiconductor light source. One of the ellipsoidal reflecting surfaces has a first focal point set at the semiconductor light source or in the vicinity of the same and has a second focal point set at a focal point of one of the paraboloidal reflecting surfaces or in the vicinity of the same, and another one of the ellipsoidal reflecting surfaces has a first focal point set at the semiconductor light source or in the vicinity of the same and has a second focal point set at a focal point of another one of the paraboloidal reflecting surfaces or in the vicinity of the same.

The third aspect of the disclosed subject matter includes examples of reflecting surfaces that can be configured as the first and second reflectors.

According to a fourth aspect of the disclosed subject matter, the vehicle lamp unit can further include: a first shading shutter for blocking a portion of the light emitted from the semiconductor light source and reflected by the first reflector disposed between the one of the ellipsoidal reflecting surfaces and the one of the paraboloidal reflecting surfaces; and a second shading shutter for blocking a portion of the light emitted from the semiconductor light source and reflected by the first reflector disposed between the other one of the ellipsoidal reflecting surfaces and the other one of the paraboloidal reflecting surfaces, wherein the focal point of the one of the ellipsoidal reflecting surfaces is set at an upper end edge of the first shading shutter or in the vicinity of the same, and the focal point of the other one of the ellipsoidal reflecting surfaces is set at an upper end edge of the second shading shutter or in the vicinity of the same.

According to the fourth aspect of the disclosed subject matter, the first and second shading shutters enable the formation of a luminous intensity distribution pattern including a passing beam cutoff pattern.

According to a fifth aspect of the disclosed subject matter, the reflecting surface of the first reflector can include a pair of ellipsoidal reflecting surfaces disposed horizontally adjacent to each other, the reflecting surfaces of the second reflector can include paraboloidal reflecting surfaces respectively disposed on left and right sides of the semiconductor light source, the one of the ellipsoidal reflecting surfaces can be disposed on the right side, the one of the paraboloidal reflecting surfaces can be disposed on the left side, the other one of the ellipsoidal reflecting surfaces can be disposed on the left side, and the other one of the paraboloidal reflecting surfaces can be disposed on the right side.

The fifth aspect of the disclosed subject matter includes examples of the disposition of the reflecting surfaces of the first and second reflectors. Accordingly, for example, a disposition of the reflecting surfaces of the first and second reflectors may be configured such that the reflecting surface of the first reflector is a pair of ellipsoidal reflecting surfaces disposed adjacent to each other in a vertical direction; the reflecting surfaces of the second reflector can be paraboloidal reflecting surfaces disposed on upper and lower opposite sides of the semiconductor light source; one of the ellipsoidal reflecting surfaces can be disposed on the upper side; one of the paraboloidal reflecting surfaces can be disposed on the lower side; another of the ellipsoidal reflecting surfaces can be disposed on the lower side; and another of the paraboloidal reflecting surfaces can be disposed on the upper side.

According to a sixth aspect of the disclosed subject matter, the vehicle lamp unit according to any one of the first to fifth aspects of the disclosed subject matter can further include lenses for horizontal diffusion respectively disposed in front of the reflecting surfaces of the second reflector.

According to the sixth aspect of the disclosed subject matter, the light reflected by the reflecting surfaces of the second reflector is radiated forward through the lenses for horizontal diffusion, thus enabling the formation of a desired luminous intensity distribution pattern extending in a horizontal direction.

According to a seventh aspect of the disclosed subject matter, the projection lens and the lenses for horizontal diffusion in the vehicle lamp unit can be formed integrally with each other.

The seventh aspect of the disclosed subject matter includes examples of the construction of the projection lens and the lenses for horizontal diffusion. According to the seventh aspect of the disclosed subject matter, the projection lens and the lenses for horizontal diffusion are formed integrally with each other and, therefore, each lens can be easily mounted.

According to an eighth aspect of the disclosed subject matter, in the vehicle lamp unit according to the first or second aspect of the disclosed subject matter, the reflecting surface of the first reflector can include a pair of ellipsoidal reflecting surfaces disposed adjacent to each other, the reflecting surfaces of the second reflector can include flat reflecting surfaces respectively disposed on both sides of the semiconductor light source, the vehicle lamp unit can further include second projection lenses respectively disposed in front of the flat reflecting surfaces, one of the ellipsoidal reflecting surfaces has a first focal point set at the semiconductor light source or in the vicinity of the same and has a second focal point set at a focal point of the second projection lens disposed in front of one of the flat reflecting surfaces or in the vicinity thereof, and another one of the ellipsoidal reflecting surfaces has a first focal point set at the semiconductor light source or in the vicinity of the same and has a second focal point set at a focal point of the second projection lens disposed in front of another one of the flat reflecting surfaces or in the vicinity thereof.

The eighth aspect of the disclosed subject matter includes examples of the reflecting surfaces of the first and second reflectors.

According to a ninth aspect of the disclosed subject matter, the vehicle lamp unit according to the eighth aspect can further include: a first shading shutter for blocking a portion of the light emitted from the semiconductor light source and reflected by the first reflector, the first shading shutter being disposed between the one of the ellipsoidal reflecting surfaces and the one of the flat reflecting surfaces; and a second shading shutter for blocking a portion of the light emitted from the semiconductor light source and reflected by the first reflector, the second shading shutter being disposed between the other one of the ellipsoidal reflecting surfaces and the other one of the flat reflecting surfaces.

According to the ninth aspect of the disclosed subject matter, the first and second shading shutters enable the formation of a luminous intensity distribution pattern including a passing beam cutoff pattern.

According to a tenth aspect of the disclosed subject matter, in the vehicle lamp unit according to the eighth or ninth aspect of the disclosed subject matter, the reflecting surface of the first reflector can include a pair of ellipsoidal reflecting surfaces horizontally disposed adjacent to each other, the reflecting surfaces of the second reflector include flat reflecting surfaces respectively disposed on left and right sides of the semiconductor light source, one of the ellipsoidal reflecting surfaces is disposed on the right side, one of the flat reflecting surfaces is disposed on the left side, another one of the ellipsoidal reflecting surfaces is disposed on the left side, and another one of the flat reflecting surfaces is disposed on the right side.

The tenth aspect of the disclosed subject matter includes an example showing the disposition of the reflecting surfaces of the first and second reflectors. Accordingly, for example, such a disposition of the reflecting surfaces of the first and second reflectors, may be configured such that the reflecting surface of the first reflector is a pair of ellipsoidal reflecting surfaces disposed adjacent to each other in a vertical direction; the reflecting surfaces of the second reflector are flat reflecting surfaces disposed on upper and lower sides of the semiconductor light source; one of the ellipsoidal reflecting surfaces is disposed on the upper side; one of the flat reflecting surfaces is disposed on the lower side; another of the ellipsoidal reflecting surfaces is disposed on the lower side; and another of the flat reflecting surfaces is disposed on the upper side.

According to an eleventh aspect of the disclosed subject matter, the opening of the first reflector can be set in such shape and size that only light that is incident on the entire surface of the first projection lens of the light emitted from the semiconductor light source can pass therethrough.

According to the eleventh aspect of the disclosed subject matter, the opening of the first reflector is set in such shape and size that only light that is incident on the entire surface of the first projection lens of the light emitted from the semiconductor light source can pass therethrough, and the light not passing through the opening (i.e., the light not incident on the entire surface of the projection lens of the light emitted from the semiconductor light source) is reflected forward by the reflecting surface of the first reflector and the reflecting surfaces of the second reflector, thus enabling effective use of the light emitted from the semiconductor light source.

According a twelfth aspect of the disclosed subject matter, the vehicle lamp unit according to any one of the first to eleventh aspects further includes a third shading shutter for blocking a portion of the light emitted from the semiconductor light source, the third shading shutter being disposed between the semiconductor light source and the first reflector, and a focal point of the first projection lens is set at an upper end edge of the third shading shutter or in the vicinity of the same.

According to a thirteenth aspect of the disclosed subject matter, a vehicle lamp unit includes a plurality of the vehicle lamp units according to the twelfth aspect of the disclosed subject matter, wherein the focal lengths of the first projection lenses of the vehicle lamp units differ from each other, and the optical axes of the vehicle lamp units are adjusted so that luminous intensity patterns projected from the first projection lenses overlap each other.

According to the thirteenth aspect of the disclosed subject matter, a luminous intensity distribution pattern which changes gradually in size and brightness can be formed.

Accordingly, a vehicle lamp unit which has a novel design can be provided. In addition, the vehicle lamp unit can include a semiconductor light source which is not visually observable (or is difficult to see) from the outside even if a projection lens is disposed such that it appears as if it is floating in air. Also, a vehicle lamp unit can be provided in which light that is not incident on a projection lens of the light emitted from a semiconductor light source can be effectively utilized.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Examples of vehicle lamp units made in accordance with principles of the disclosed subject matter will be described with reference to the accompanying drawings.

Figure 1:
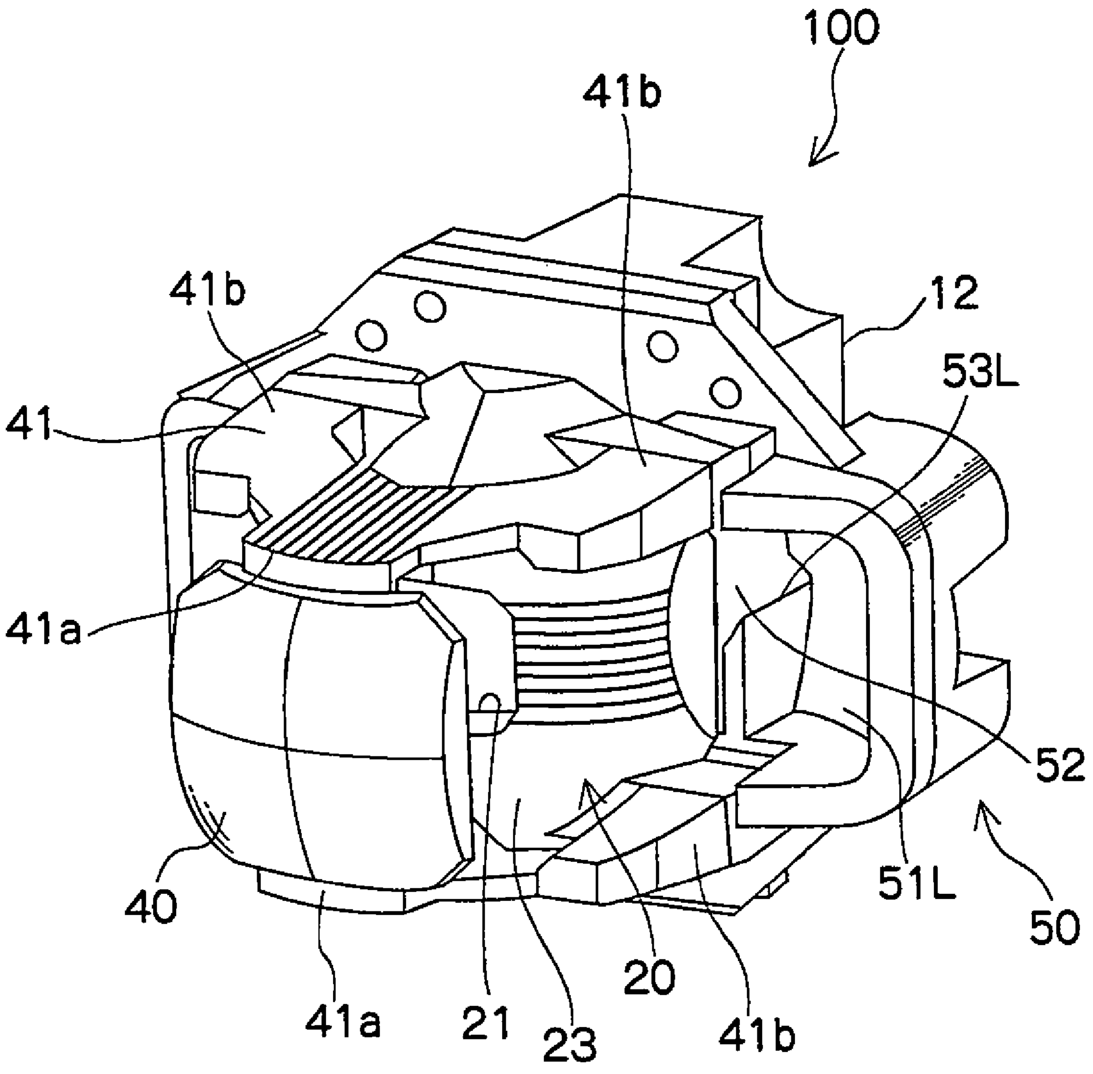
FIG. 1 is a perspective view of an example of a vehicle lamp unit made in accordance with principles of the presently disclosed subject matter.
Figure 2:
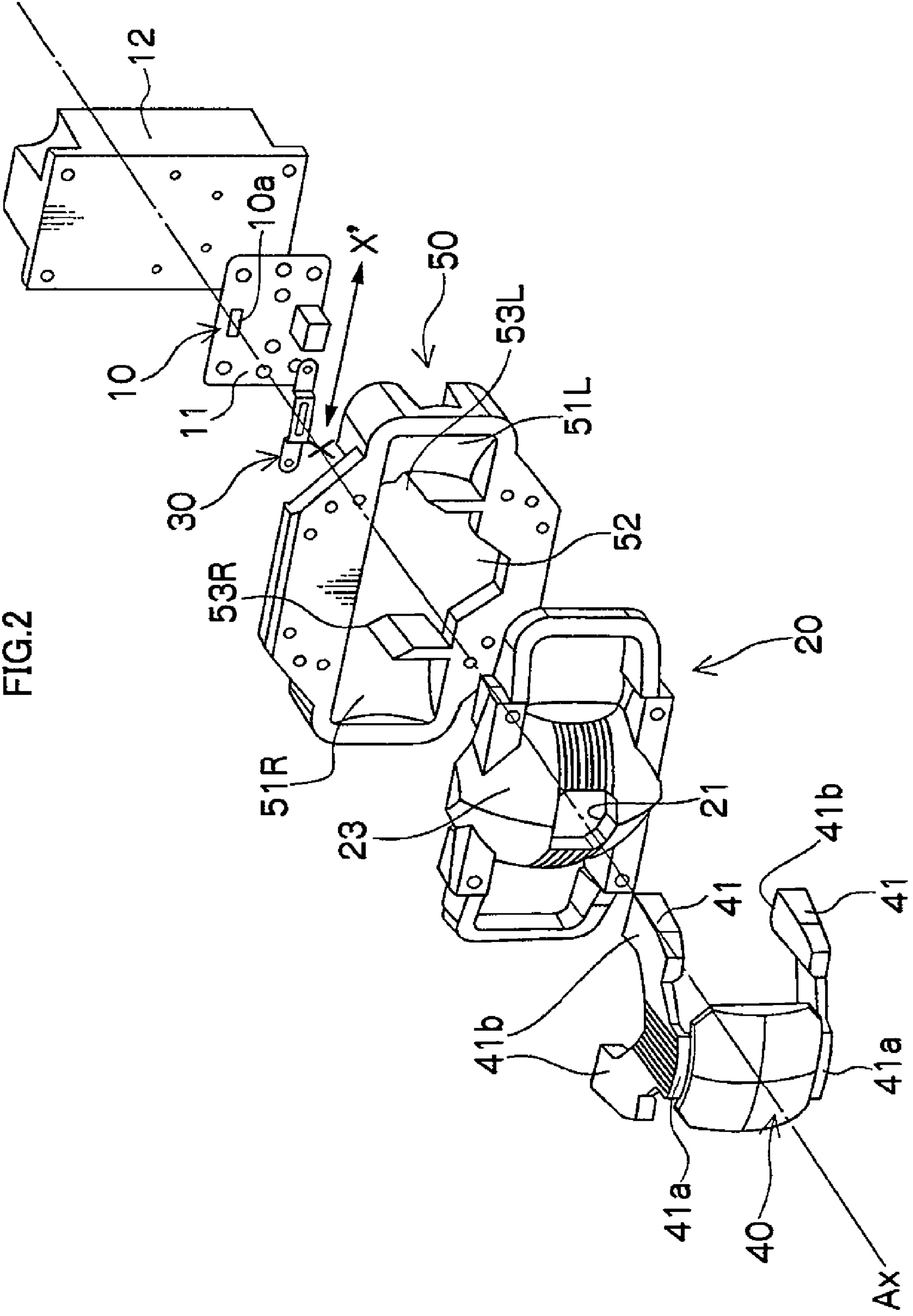
FIG. 2 is an exploded perspective view of the vehicle lamp unit shown in FIG. 1.
Figure 3:
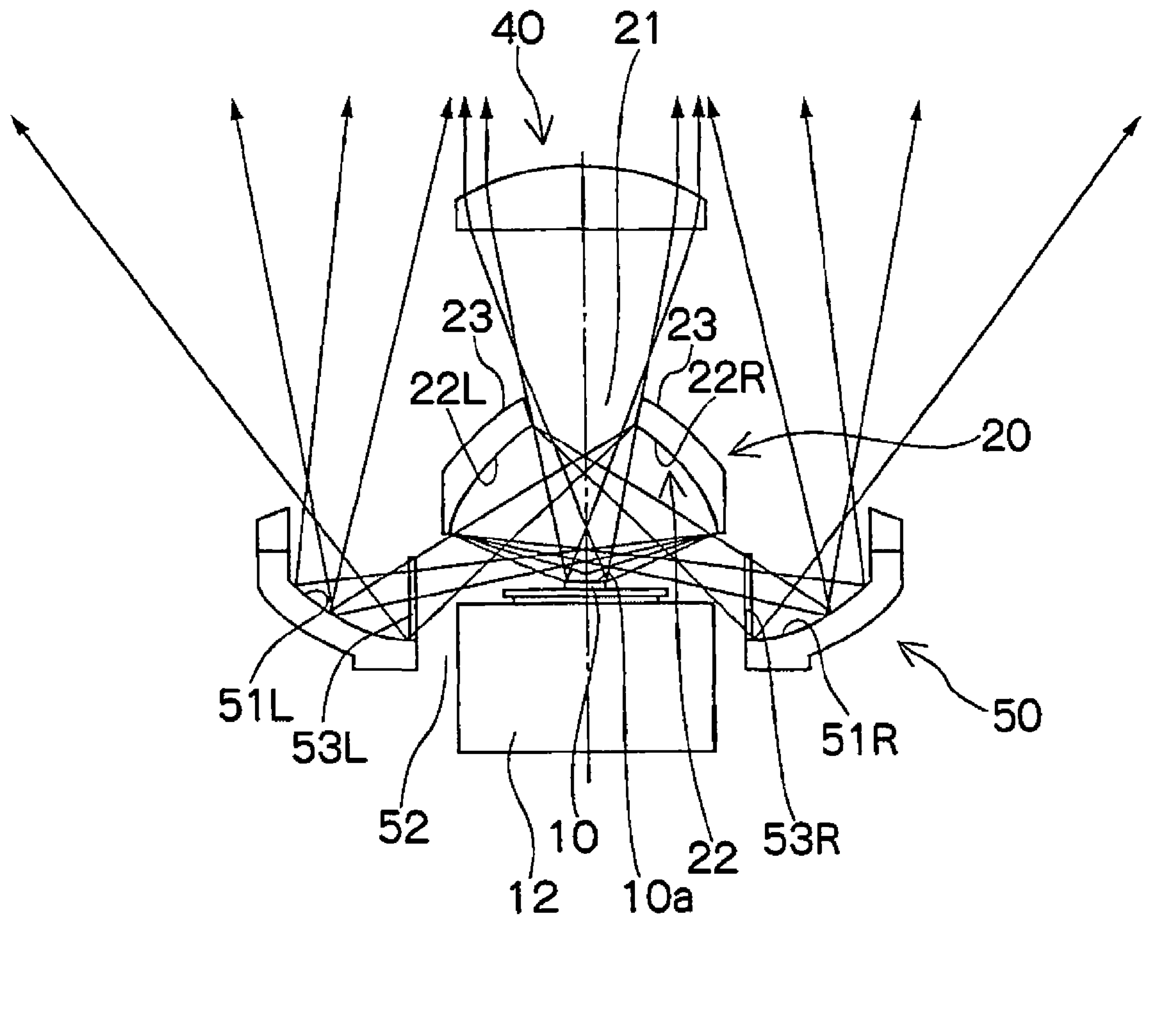
FIG. 3 is a top sectional view of the vehicle lamp unit shown in FIG. 1.

FIG. 1 is a perspective view of an example of a vehicle lamp unit made in accordance with principles of the disclosed subject matter. FIG. 2 is an exploded perspective view of the vehicle lamp unit shown in FIG. 1. FIG. 3 is a sectional view of the vehicle lamp unit shown in FIG. 1.

The vehicle lamp unit can be configured as a headlamp of a motor vehicle, a spot light, a tail light, an auxiliary light, a traffic light, or the like.

As shown in FIGS. 1 to 3, an embodiment of a vehicle lamp unit 100 can include a semiconductor light source 10, a first reflector 20 disposed in front of a light emitting surface 10*a* of the semiconductor light source 10, a shading shutter 30 disposed between the semiconductor light source 10 and the first reflector 20, a projection lens 40 disposed in a position in front of an opening 21 of the first reflector 20 so as not to contact with the first reflector 20, and a second reflector 50 having reflecting surfaces 51L and 51R disposed on both sides of the semiconductor light source 10.

The semiconductor light source 10 can include one or a plurality of white or colored light emitting diodes. In the present embodiment, an LED package in which four light emitting diode chips are arranged in a horizontal direction is used for the purpose of forming a luminous intensity distribution pattern extending in a horizontal direction. As shown in FIG. 2, the semiconductor light source 10 is mounted on a given base plate 11 and the base plate 11 is fixed on a heat radiating member 12 by fastening with screws, with the light emitting surface 10*a* of the semiconductor light source 10 facing forward. The heat radiating member 12 radiates heat generation accompanying emission of light from the semiconductor light source 10.

As shown in FIGS. 2 and 3, the first reflector 20 is disposed in front of the light emitting surface 10*a* of the semiconductor light source 10. The first reflector 20 is a generally semispherical reflector having a concave inner reflecting surface 22L and 22R and a convex outer surface 23 opposite from the inner reflecting surface 22L and 22R. The first reflector 20 is fixed on the second reflector 50 by fastening with screws, with the outer surface 23 facing forward and the inner reflecting surface 22L and 22R facing the light emitting surface 10*a* of the semiconductor light source 10 (that is, covering the semiconductor light source 10 so that the light emitting surface 10*a* cannot be visually seen from the outside at least from certain angles). The opening 21 penetrates through the first reflector 20 from the inner reflecting surface 22L and 22R to the outer surface 23 and can be formed at a position on an optical axis Ax of the first reflector 20 (and optical axis Ax of the light unit). Thus, light from the semiconductor light source 10 (light emitted from the semiconductor light source 10) passes through the opening 21. The opening 21 can be configured in a shape (for example, a rectangular shape similar to the shape of the projection lens 40 in the present embodiment) and a size such that only light incident on the entire surface of the projection lens 40 of the light emitted from the semiconductor light source 10 can pass therethrough. Light which does not pass through the opening 21 (i.e., light not incident on the entire surface of the projection lens 40 of the light emitted from the semiconductor light source 10) is reflected forward by the inner reflecting surfaces 22R and 22L of the first reflector 20 and by reflecting surfaces 51R and 51L of the second reflector 50. The light emitted from the semiconductor light source 10 can be effectively utilized in this way. Plating, coloring and/or cutting for example can be performed for an ornamentation purpose on the outer surface 23 of the first reflector 20.

The first reflector 20 is integrally formed by, for example, injection molding of a synthetic resin, and mirror finishing such as aluminum deposition can be performed at least on the inner reflecting surface 22L and 22R.

The inner reflecting surface 22L and 22R of the first reflector 20 is a reflecting surface for reflecting light which does not pass through the opening 21 of the light emitted from the semiconductor light source 10. The inner reflecting surface 22L and 22R reflects light toward each of the reflecting surfaces 51R and 51L of the second reflector 50 respectively disposed on both sides of the semiconductor light source 10. The inner reflecting surface 22L and 22R can include, for example, ellipsoidal reflecting surfaces 22R and 22L configured in a rotationally ellipsoidal form or the like disposed in left and right positions adjacent to each other, as shown in FIG. 3.

The ellipsoidal reflecting surface 22R on the right-hand side as viewed in FIG. 3 has a first focal point set on the semiconductor light source 10 (or in the vicinity of the same) and a second focal point set at a focal point (or in the vicinity of the same) of the left reflecting surface 51L of the second reflector 50 (paraboloidal reflecting surface 51L in the present embodiment). Accordingly, the right ellipsoidal reflecting surface 22R converges light which does not pass through the opening 21 onto the second focal point, and then reflects the light toward the left reflecting surface 51L of the second reflector 50 (paraboloidal reflecting surface 51L in the present embodiment).

Similarly, the ellipsoidal reflecting surface 22L on the left-hand side as viewed in FIG. 3 has a first focal point set on the semiconductor light source 10 (or in the vicinity of the same) and a second focal point set at a focal point (or in the vicinity of the same) of the right reflecting surface 51R of the second reflector 50 (paraboloidal reflecting surface 51R in the present embodiment). Accordingly, the left ellipsoidal reflecting surface 22L converges light which does not pass through the opening 21 onto the second focal point, and then reflects the light toward the right reflecting surface 51R of the second reflector 50 (paraboloidal reflecting surface 51R in the present embodiment).

Figure 5:
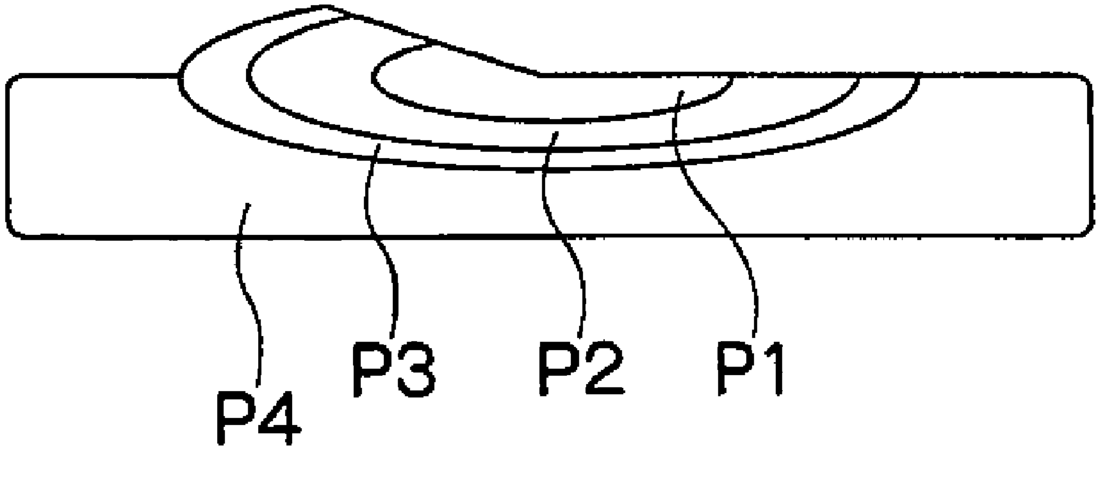
FIG. 5 is a diagram for explaining a luminous intensity distribution pattern formed by light projected forward through a projection lens of the vehicle lamp unit of FIG. 1.

As shown in FIG. 2, the shading shutter 30 can be disposed between the semiconductor light source 10 and the first reflector 20. The projection lens 40 has a focal point set at an upper end edge of the shading shutter 30 (or in the vicinity of the same, for example, at a position slightly lower than the upper end edge of the shading shutter 30). The upper end edge can be considered to be the cut-off portion of the shade that is incident to light from the light source and defines an outer perimeter of the light distribution pattern being made by the lamp unit. Accordingly, a portion of the light from the semiconductor light source 10 is blocked by the shading shutter 30, while another portion of the light is projected forward through the projection lens 40. As a result, for example, a luminous intensity distribution pattern P1 including a passing beam cutoff pattern (a luminous intensity distribution pattern for a passing beam) is formed by means of the shading shutter 30, as shown in FIG. 5.

Figure 4A:
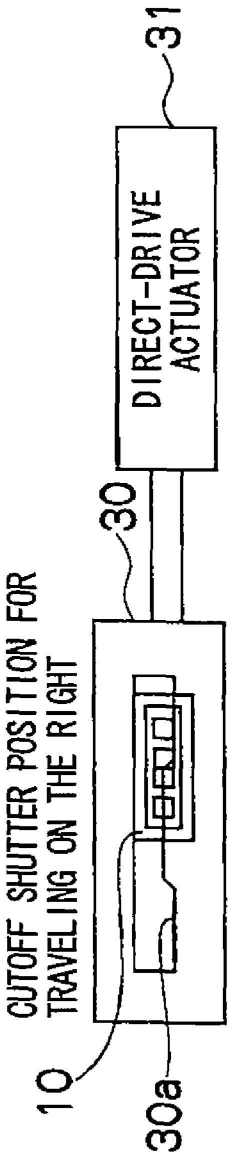
FIGS. 4A to 4C are diagrams for explaining a shading shutter configured for use with the vehicle lamp unit of FIG. 1.
Figure 4B:
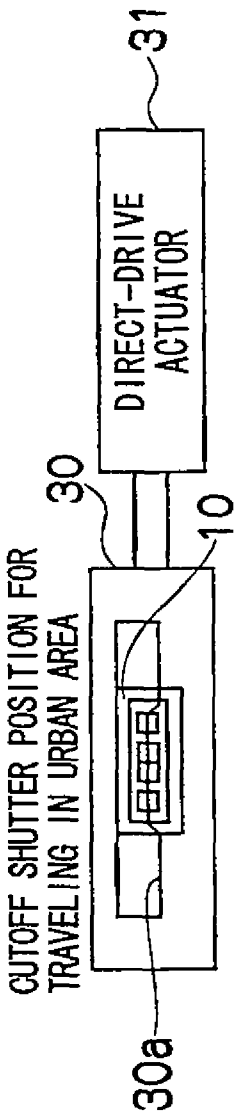
Figure 4C:
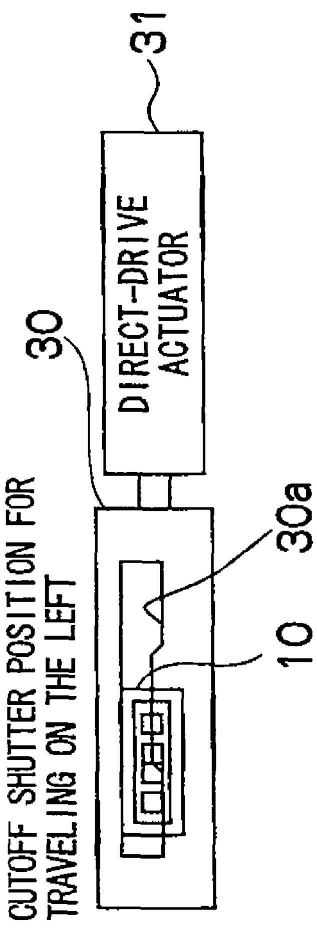

FIGS. 4A to 4C are diagrams for explaining the operation of the shading shutter 30. As shown in FIGS. 4A to 4C, a direct-drive actuator 31 can be connected to the shading shutter 30. The direct-drive actuator 31 moves the shading shutter 30 in a direction perpendicular to the optical axis Ax of the semiconductor light source 10 (in the direction of arrow X-X' in FIG. 2) to set the shading shutter 30 in a predetermined position (a cutoff shutter position for traveling on the right, a cutoff shutter position for traveling in an urban area, a cutoff shutter position for traveling on the left or the like) according to a command input, for example, from a driver's seat in a vehicle on which the vehicle lamp unit 100 is mounted. An opening pattern 30*a* for forming a cutoff pattern is formed in the shading shutter 30, thereby enabling luminous intensity distribution patterns including different cutoff patterns, each of which can be selected by setting the shading shutter 30 in different positions, to be formed.

As shown in FIGS. 1 to 3, the projection lens 40 is disposed in front of the opening 21 of the first reflector 20. The projection lens 40 is a lens can be configured to project forward the light from the semiconductor light source 10 that passes through the opening 21 of the first reflector 20. In the present embodiment, a convex lens which has right, left, top and bottom edges that are cut off to be substantially rectangular as seen in a front view, is used as the projection lens 40. The projection lens 40 may be a lens of other shapes, e.g., an aspherical convex lens, etc.

Projection lens attachment legs 41 can be formed integrally with the projection lens 40 and can be fixed on the first reflector 20 by fastening with screws to dispose the projection lens 40 in a position in front of the opening 21 of the first reflector 20 such that the projection lens 40 does not contact the first reflector 20 (that is, the projection lens is disposed such that it appears as if it is floating in air). In addition, the projection lens 40 and the projection lens attachment legs 41 can be formed integrally with each other by, for example, injection molding of a transparent or semitransparent material such as acrylic or polycarbonate. Further, the first reflector 20 can be configured to cover the semiconductor light source 10 to form a shaded region, thereby enabling the projection lens 40 to have a three-dimensional quality in its appearance such that it appears as if it is floating in air.

Each projection lens attachment leg 41 has one end 41*a* to which the projection lens 40 is fixed and other end 41*b* fixed on the first reflector 20 by fastening with screws or other adhesive structures or substances. By using the projection lens attachment legs 41, the projection lens 40 can easily be disposed in a position in front of the opening 21 of the first reflector 20 so as not to contact with the first reflector 20.

The length of the projection lens attachment legs 41 along the optical axis Ax can be set so that the focal point of the projection lens 40 (of, for example, F70 mm) is positioned at the upper end edge of the shading shutter 30 (or in the vicinity of the same, for example, at a position slightly lower than the upper end edge of the shading shutter 30). A portion of light emitted from the semiconductor light source 10 is blocked by the shading shutter 30, while another portion of the light passes through the opening 21 of the first reflector 20 and is thereafter projected forward through the projection lens 40 to form, for example, the luminous intensity distribution pattern P1 including the cutoff pattern shown in FIG. 5. FIG. 5 is a diagram for explaining the luminous intensity distribution pattern formed by the light projected forward through the projection lens 40.

If the projection lens 40 has a different focal length, the length of the projection lens attachment legs 41 along the optical axis Ax may be adjusted to enable the projection lens 40 to be disposed in a particular position in front of the opening 21 of the first reflector 20 so as not to contact the first reflector 20.

Figure 6:
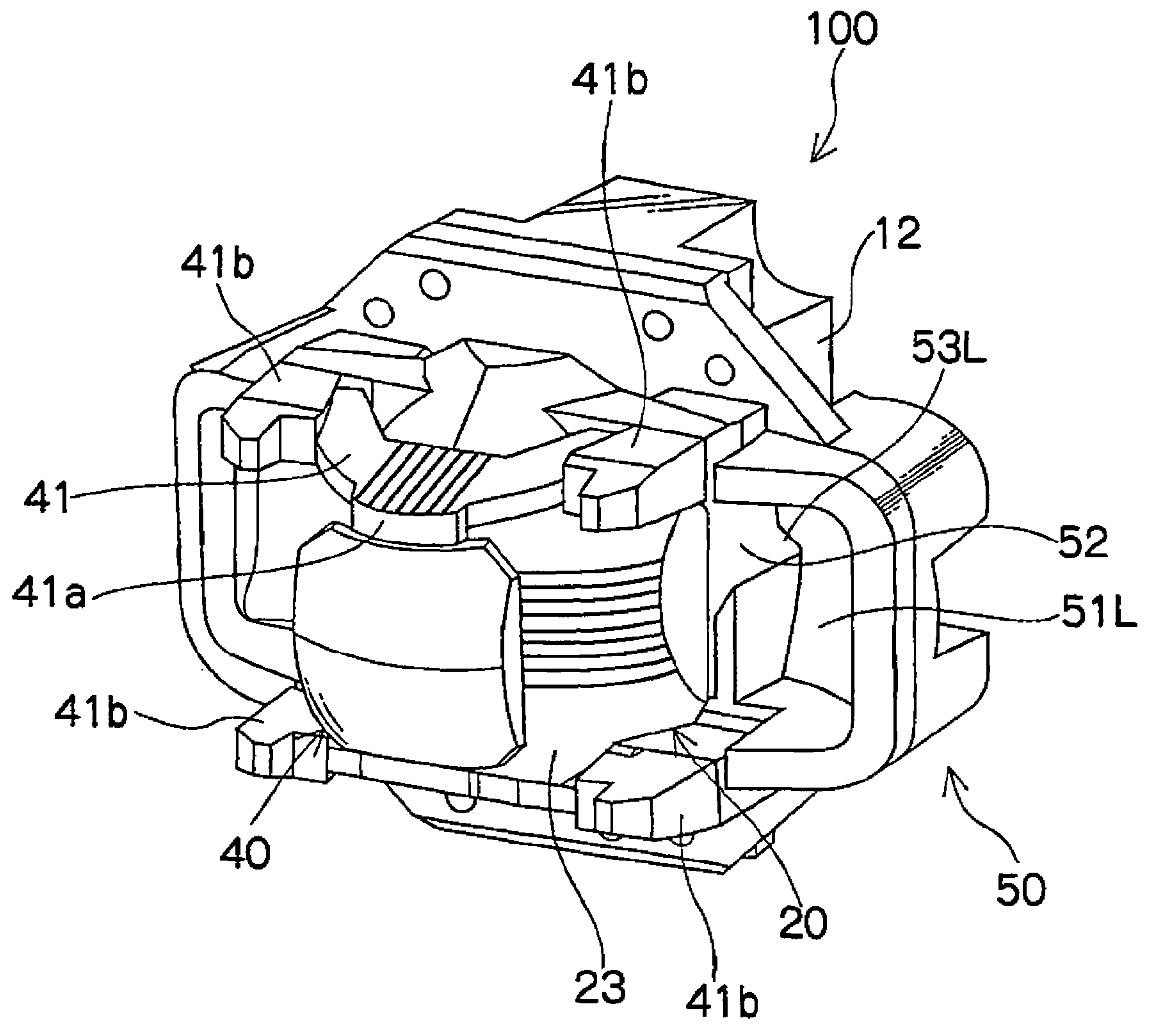
FIG. 6 is a perspective view of another example of a vehicle lamp unit made in accordance with principles of the disclosed subject matter and including a projection lens having a different focal length.

FIG. 6 is a perspective view of a vehicle lamp unit 100 using a projection lens 40 having a focal length (e.g., F50 mm) that is shorter than the focal length of the projection lens 40 shown in FIG. 1.

For example, a plurality of vehicle lamp units 100 having projection lens 40 differing in focal length from each other (e.g., a vehicle lamp unit 100 having an F70 mm projection lens 40, a vehicle lamp unit 100 having an F50 mm projection lens 40, and a vehicle lamp unit 100 having an F20 mm projection lens 40) can be disposed in a left-right direction or a vertical direction. The optical axes Ax of the vehicle lamp units 100 can be adjusted so that the luminous intensity distribution patterns projected from the projection lens 40 of the vehicle lamp units 100 overlap one another. In this way, the formation of luminous intensity distribution patterns P1 to P3 which gradually change in size and brightness can be formed and the combined road surface luminous intensity distribution pattern can be made generally uniform. The luminous intensity distribution pattern P1 shown in FIG. 5 is projected from the F70 mm projection lens 40 and is the brightest; the luminous intensity distribution pattern P2 is projected from the F50 mm projection lens 40 and is lower in brightness than the luminous intensity distribution pattern P1; and the luminous intensity distribution pattern P3 is projected from the F20 mm projection lens 40 and is lower in brightness than the luminous intensity distribution pattern P2.

As shown in FIGS. 2 and 3, the reflecting surfaces 51R and 51L of the second reflector 50 are disposed on both sides of semiconductor light source 10, respectively. The second reflector 50 is fixed on the heat radiating member 12 by fastening with screws or the like, with the semiconductor light source 10 positioned in an opening 52 between the reflecting surfaces 51R and 51L, and with the reflecting surfaces 51R and 51L positioned on the right and left sides of the semiconductor light source 10, respectively.

A left shading shutter 53L is disposed between the left reflecting surface 51L and the opening 52 of the second reflector 50. The left reflecting surface 51L (paraboloidal reflecting surface 51L in the present embodiment) has a focal point set at the upper end edge of the shading shutter 53L (or in the vicinity of the same). Accordingly, light emitted from the semiconductor light source 10 is reflected by the right ellipsoidal reflecting surface 22R to travel toward the left reflecting surface 51L, and is partially blocked by the left shading shutter 53L. The light which is not blocked is incident on the left reflecting surface 51L (paraboloidal reflecting surface 51L).

Similarly, a right shading shutter 53R is disposed between the right reflecting surface 51R and the opening 52 of the second reflector 50. The right reflecting surface 51R (paraboloidal reflecting surface 51R in the present embodiment) has a focal point set at the upper end edge of the shading shutter 53R (or in the vicinity of the same). Accordingly, light emitted from the semiconductor light source 10 is reflected by the left ellipsoidal reflecting surface 22L to travel toward the right reflecting surface 51R, and is partially blocked by the right shading shutter 53R. The light which is not blocked is incident on the right reflecting surface 5R (paraboloidal reflecting surface 5R). The shading shutters 53R and 53L form luminous intensity distribution patterns extending in a horizontal direction at a position where no glare light is emitted to the opposite lane side (for example, at a position lower than a horizontal line by 0.57 degree).

The second reflector 50 can be integrally formed, for example, by injection molding of a synthetic resin. Mirror finishing such as aluminum deposition can be performed at least on the portions corresponding to the reflecting surfaces 51R and 51L.

The reflecting surfaces 51R and 51L are reflecting surfaces for reflecting forward light that is emitted from the semiconductor light source 10 and is reflected by the inner reflecting surfaces 22R and 22L of the first reflector 20. For example, as shown in FIG. 3, the reflecting surfaces 51R and 51L are paraboloidal reflecting surfaces, such as a paraboloid of revolution or the like, which are disposed on the left and right sides of the semiconductor light source 10, respectively.

Referring to FIG. 3, the left paraboloidal reflecting surface 51L has a focal point set at the upper end edge (or in the vicinity of the same) of the shading shutter 53L provided on the left-hand side and is formed so as to form a luminous intensity distribution pattern extending in a horizontal direction. Accordingly, a portion of the light emitted from the semiconductor light source 10, which is reflected by the right ellipsoidal reflecting surface 22R and then partially blocked by the left shading shutter 53L, is reflected forward by the left paraboloidal reflecting surface 51L. Therefore, a luminous intensity distribution pattern P4 (a luminous intensity distribution pattern for a passing beam) which includes, as shown in FIG. 5, a passing beam cutoff pattern and extends in the horizontal direction is formed by means of the shading shutter 53L.

Similarly, the right paraboloidal reflecting surface 51R has a focal point set at the upper end edge of the shading shutter 53R (or in the vicinity of the same) provided on the right-hand side and is formed so as to form a luminous intensity distribution pattern extending in a horizontal direction. Accordingly, a portion of light emitted from the semiconductor light source 10, which is reflected by the left ellipsoidal reflecting surface 22L and then partially blocked by the right shading shutter 53R, is reflected forward by the right paraboloidal reflecting surface 51R. Therefore, a luminous intensity distribution pattern P4 (a luminous intensity distribution pattern for a passing beam) which includes, as shown in FIG. 5, a passing beam cutoff pattern and extends in the horizontal direction is formed by means of the shading shutter 53R.

In the vehicle lamp unit 100 according to the present embodiment, as described above, the semiconductor light source 10 is substantially covered with the first reflector 20 and, therefore, the light source 10 is difficult to be visually seen from outside the lamp unit 100 even when the projection lens 40 is disposed in a position in front of the opening 21 of the first reflector 20 so as not to contact with the first reflector 20 (that is, even when the projection lens 40 is disposed such that it appears as if it is floating in air). That is, the vehicle lamp unit 100 according to the present embodiment can be configured as a vehicle lamp unit having a novel design in which the projection lens 40 is disposed to appear as if it is floating in air, and the semiconductor light source 10 is not visually observable (or difficult to see) from the outside.

In addition, in the vehicle lamp unit 100 according to the present embodiment, the light not passing through the opening 21 of the first reflector 20 (i.e., the light emitted from the semiconductor light source 10 that is not incident on the projection lens 40) is reflected by the reflecting surfaces 22R and 22L of the first reflector 20 and the reflecting surfaces 51R and 51L of the second reflector 50 to travel forward, thus enabling effective use of the light from the semiconductor light source 10 that is not incident on the projection lens 40.

Also, in the vehicle lamp unit 100 according to the present embodiment, the opening 21 for passing light emitted from the semiconductor light source 10 is formed in the first reflector 20 covering the semiconductor light source 10. Therefore, even though light emission from the semiconductor light source is accompanied by generation of heat, the heat can be released by radiation through the opening 21.

Further, in the vehicle lamp unit 100 according to this particular embodiment, the projection lens 40 is disposed in a position in front of the opening 21 of the first reflector 20 so as not to contact with the first reflector 20 and is, therefore, free from the influence of heat generation which accompanies light emission from the semiconductor light source 10, so that the desired luminous intensity distribution pattern can be obtained.

A modified example of the vehicle lamp unit will next be described.

Figure 7:
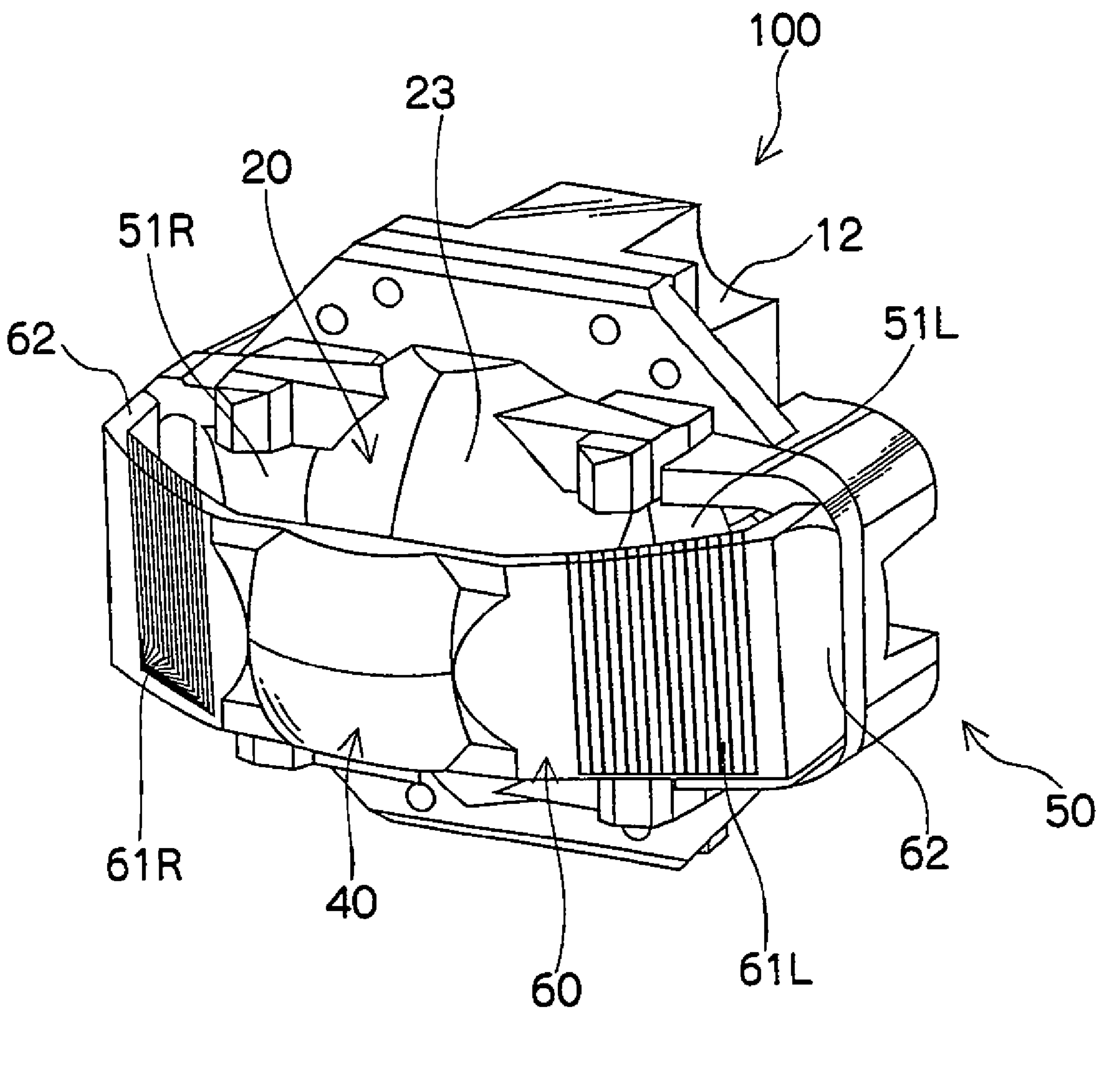
FIG. 7 is a perspective view of another example of a vehicle lamp unit made in accordance with principles of the disclosed subject matter including a lens plate in which a projection lens and left and right diffuser lenses are formed integrally with each other.
Figure 8:
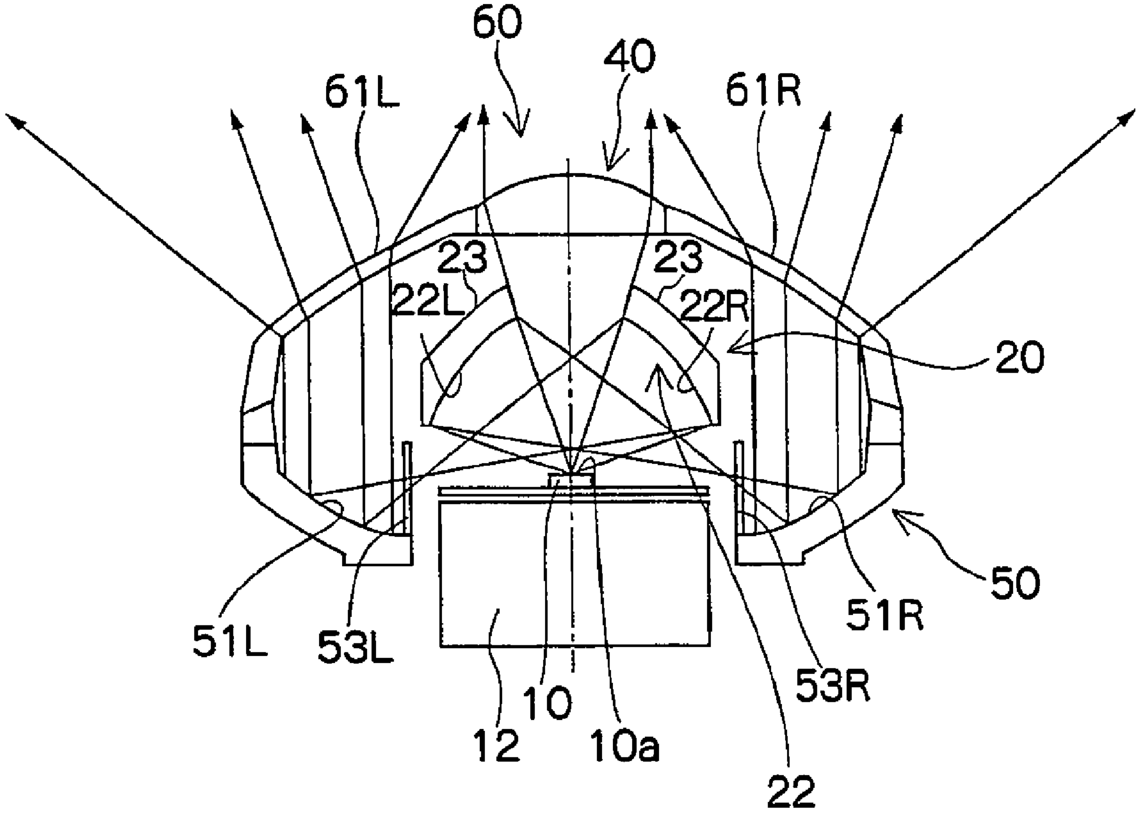
FIG. 8 is a sectional view of the vehicle lamp unit shown in FIG. 7.

FIG. 7 is a perspective view of a vehicle lamp unit 100 (modified example) using a lens plate 60 in which a projection lens 40 and left and right diffuser lenses 61R and 61L are formed integrally with each other. FIG. 8 is a sectional view of the vehicle lamp unit 100 shown in FIG. 7.

In this modified example, attachment legs 62 of the lens plate 60 are fixed on the first reflector 20 by fastening with screws (or other similar adhesive structures or materials) to dispose the projection lens 40 in a position in front of an opening 21 of a first reflector 20 such that the projection lens 40 does not contact the first reflector 20. The projection lens 40 can also be positioned so as to dispose the left and right diffuser lenses 61R and 61L in a position in front of the reflecting surfaces 51R and 51L of the second reflector 50 such that the left and right diffuser lenses 61R and 61L do not contact the reflecting surfaces 51R and 51L. In other respects, the construction can be the same as or similar to that of the embodiment of FIG. 1. In this modified example, light reflected by the reflecting surfaces 51R and 51L of the second reflector is radiated forward through the lenses 61R and 61L for horizontal diffusion, thus enabling the formation of a desired luminous intensity distribution pattern extending in a horizontal direction. Also, since the projection lens 40 and the diffuser lenses 61R and 61L are formed integrally with each other, the projection lens 40 and the other components can be easily attached.

Figure 9:
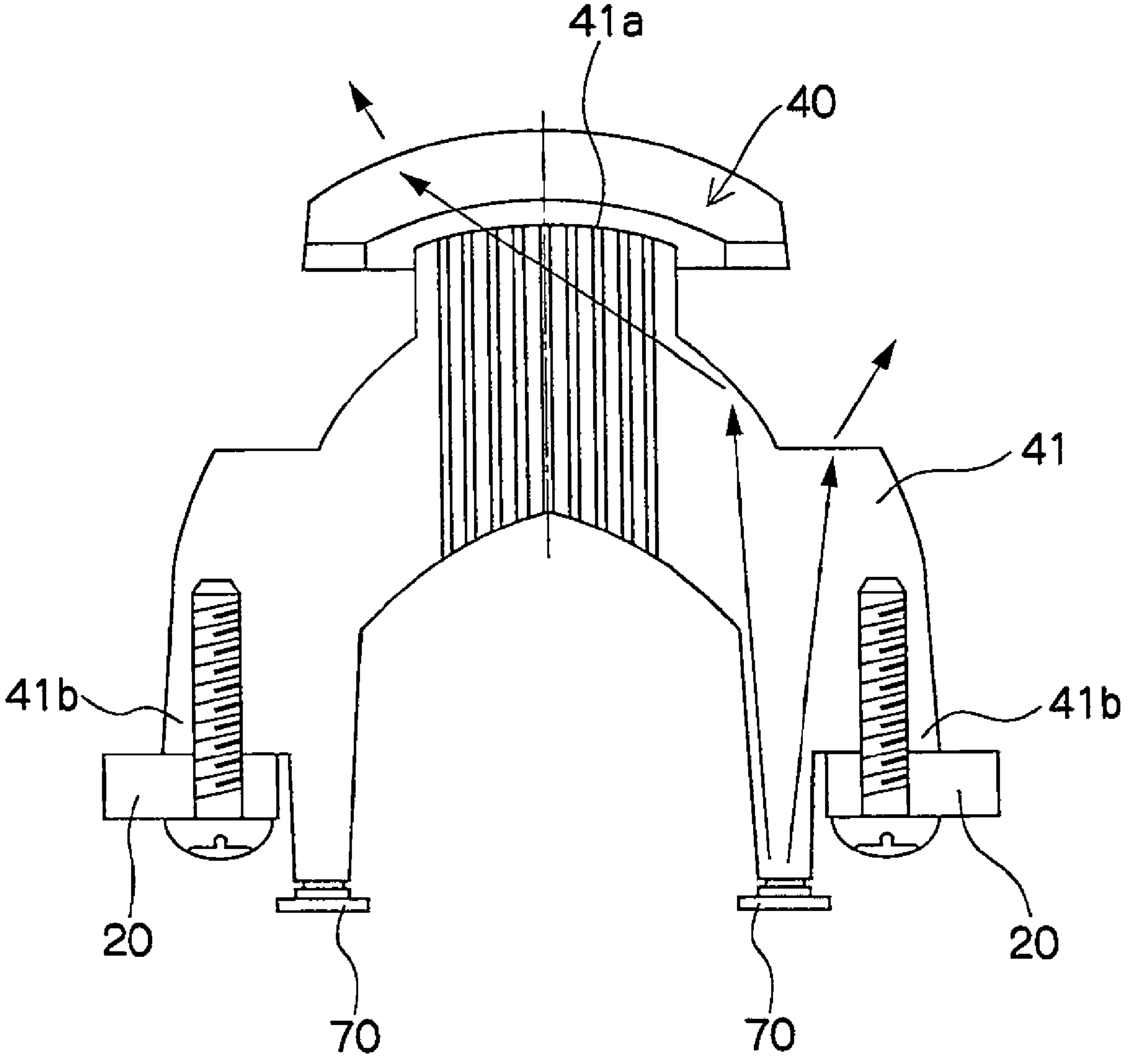
FIG. 9 is an enlarged partial view of a portion of the vehicle lamp unit of FIG. 7 in which semiconductor light sources are provided on a first reflector.

FIG. 9 is an enlarged view of a portion of a vehicle lamp unit 100 (modified example) in which semiconductor light sources 70 such as LEDs are provided on a first reflector 20 and are configured to emit light which enters projection lens attachment leg portions 41. In this modified example, a light guide lens effect enables the projection lens attachment legs 41 and the projection lens 40 to appear as if light is generated therefrom. For example, the semiconductor light sources 70 may be illuminated at the time of position lamp lighting to emit light from the projection lens attachment legs 41.

Figure 10:
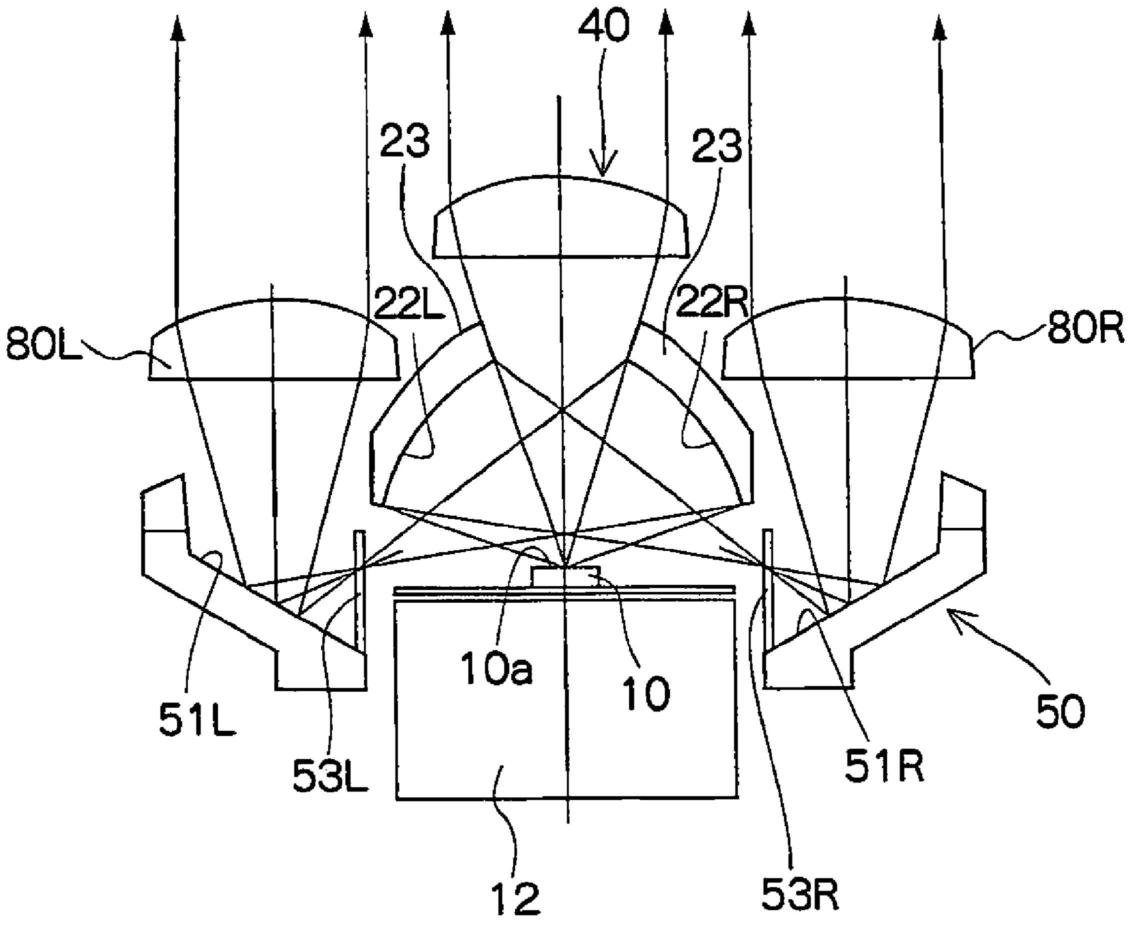
FIG. 10 is a sectional view of the vehicle lamp unit of FIG. 7 including flat reflecting surfaces in the second reflector.
Figure 11:
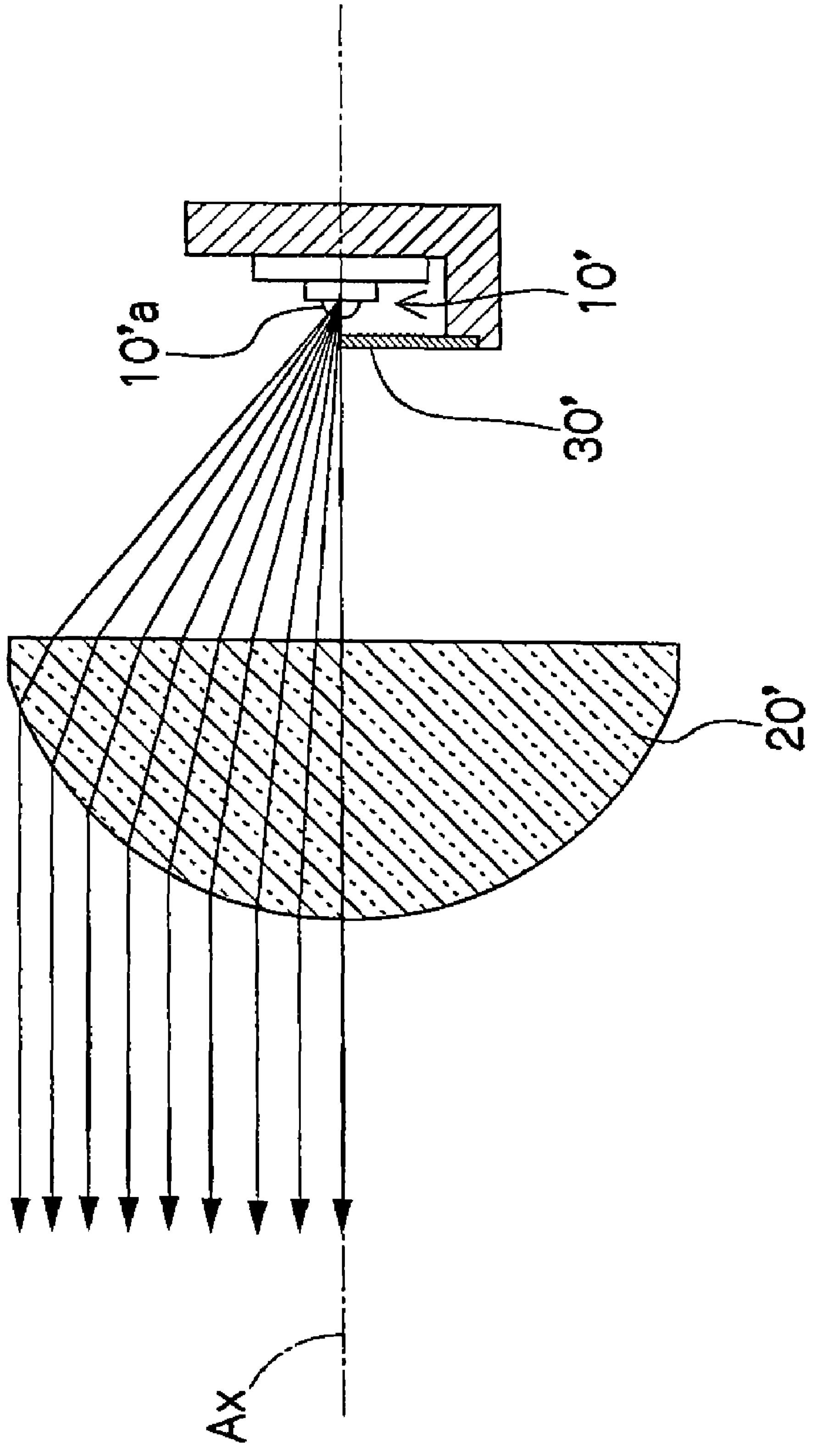
FIG.11 (RELATED ART)
FIG. 11 is a diagram for explaining a conventional vehicle lamp unit.

FIG. 10 is a sectional view of a vehicle lamp unit 100 (modified example) that uses flat reflecting surfaces in place of the paraboloidal reflecting surfaces for the reflecting surfaces 51R and 51L of the second reflector 50. In this modified example, projection lenses 80R and 80L are disposed at positions in front of reflecting surfaces 51R and 51L of the second reflector 50 so as not to contact the first reflector 20. The second focal point of the right ellipsoidal reflecting surface 22R can be located substantially at (i.e., at or in the vicinity of) a focal point of the right projection lens 80R. Similarly, the second focal point of the left ellipsoidal reflecting surface 22L can be located substantially at a focal point of the left projection lens 80L. In this modified example, therefore, the left and right reflecting surfaces 51R and 51L can form a luminous intensity distribution pattern radiating in a particular direction in a spotting manner, and is not limited to providing a luminous intensity distribution pattern extending in a horizontal direction.

While the disclosed subject matter has been described with respect to a lamp unit that uses a shading shutter 30, the disclosed subject matter is not limited to the arrangement using the shading shutter 30. A vehicle lamp unit 100 may be constructed without the shading shutter 30 or with variations of the disclosed shading shutter 30.

The vehicle lamp unit 100 can be configured to form a luminous intensity distribution pattern by directly projecting a light source image. Therefore, a lamp unit may be constructed by combining units 100 having semiconductor light sources 10 that are shifted in a horizontal and/or vertical direction with respect to the position of the shading shutter 30 and according to a desired luminous intensity distribution pattern to create a left-right luminous intensity distribution. For example, the following lamp units may be combined to obtain a luminous intensity distribution extending in a horizontal direction: a unit 100 in which the position of the semiconductor light source 10 is set in such a location/direction that light is radiated toward a shoulder of a road on which the respective vehicle travels, with respect to the position of the shading shutter 30; a unit 100 in which the position of the semiconductor light source 10 is set in such a location/direction that light is radiated toward a front direction of the driving lane; and a unit 100 in which the position of the semiconductor light source 10 is set in such a location/direction that light is radiated toward an opposite lane.

To create a luminous intensity distribution extending in a horizontal direction, the position of the projection lens 40 and position of the shutter 30 and so on, may be changed while the semiconductor light source 10 is fixed.

Also, a plurality of units 100 having differing or changing focal lengths of the projection lenses 40 can be used. For example, a passing beam lamp module, a traveling beam lamp module and a fog lamp beam module may be combined to construct one lamp unit. In such a case, aiming is performed with respect to each lamp module.

The above-described description is only illustrative in every respect. The disclosed subject matter can be implemented in other various forms without departing from the spirit and essential features of the invention. It will be apparent to those skilled in the art that various modifications and variations can be made in the presently disclosed subject matter without departing from the spirit or scope of the invention. Thus, it is intended that the invention cover the modifications and variations of the presently disclosed subject matter provided they come within the scope of the appended claims and their equivalents. All related art references described above are hereby incorporated in their entirety by reference.

What is claimed is:

1. A vehicle lamp unit configured for use with a vehicle and having an optical axis extending in a forward direction, comprising:

a semiconductor light source configured to emit light;

a first reflector having a reflecting surface configured to reflect light emitted from the semiconductor light source, the first reflector being disposed in front of a light emitting surface of the semiconductor light source while the reflecting surface is in opposition to the light emitting surface of the semiconductor light source, the first reflector having an opening formed at a position on the optical axis to allow passage of light emitted from the semiconductor light source, and the first reflector configured to substantially cover the semiconductor light source;

a second reflector having reflecting surfaces respectively disposed on opposing sides of the semiconductor light source;

a first projection lens disposed in front of the opening of the first reflector and spaced from, so as not to contact with, the first reflector, the first projection lens being configured to project light passing through the opening of the first reflector in the forward direction, wherein the reflecting surface of the first reflector is configured to reflect, toward each of the reflecting surfaces of the second reflector, portions of light emitted from the semiconductor light source that does not pass through the opening of the first reflector, and the reflecting surfaces of the second reflector are configured to reflect light that is already reflected by the reflecting surface of the first reflector into the forward direction, wherein the reflecting surface of the first reflector includes a pair of ellipsoidal reflecting surfaces disposed adjacent to each other, the reflecting surfaces of the second reflector include paraboloidal reflecting surfaces respectively disposed on opposing sides of the semiconductor light source, one of the ellipsoidal reflecting surfaces has a first focal point located substantially at the semiconductor light source and has a second focal point located substantially at a focal point of one of the paraboloidal reflecting surfaces, and an other one of the ellipsoidal reflecting surfaces has a first focal point located substantially at the semiconductor light source and has a second focal point located substantially at a focal point of an other one of the paraboloidal reflecting surfaces;

a first shading shutter configured to block a portion of light emitted from the semiconductor light source and reflected by the first reflector, the first shutter being disposed between the one of the ellipsoidal reflecting surfaces and the one of the paraboloidal reflecting surfaces; and a second shading shutter configured to block a portion of light emitted from the semiconductor light source and reflected by the first reflector, the second shutter being disposed between the other one of the ellipsoidal reflecting surfaces and the other one of the paraboloidal reflecting surfaces, wherein the second focal point of the one of the ellipsoidal reflecting surfaces is located substantially at an upper end edge of the first shading shutter, and the second focal point of the other one of the ellipsoidal reflecting surfaces is located substantially at an upper end edge of the second shading shutter.

2. The vehicle lamp unit according to claim 1, further comprising a projection lens attachment leg having one end to which the first projection lens is fixed and an other end fixed on a side of the first reflector, wherein the first projection lens is located in front of the opening of the first reflector in a spaced manner so as not to contact the first reflector by the other end of the projection lens attachment leg being fixed on the side of the first reflector.

3. The vehicle lamp unit according to claim 1, wherein the pair of ellipsoidal reflecting surfaces are disposed horizontally adjacent to each other, the paraboloidal reflecting surfaces respectively are disposed on left and right sides of the semiconductor light source, the one of the ellipsoidal reflecting surfaces is disposed on the right side of the semiconductor light source, the one of the paraboloidal reflecting surfaces is disposed on the left side of the semiconductor light source, the other one of the ellipsoidal reflecting surfaces is disposed on the left side of the semiconductor light source, and the other one of the paraboloidal reflecting surfaces is disposed on the right side of the semiconductor light source.

4. The vehicle lamp unit according to claim 1, further comprising lenses configured to horizontally diffuse light from the semiconductor light source and respectively disposed in front of the reflecting surfaces of the second reflector.

5. The vehicle lamp unit according to claim 4, wherein the projection lens and the lenses configured to horizontally diffuse light are formed integrally with each other as a continuous one piece structure.

6. The vehicle lamp unit according to claim 1, wherein the opening of the first reflector is configured in shape and size such that only light that would otherwise be incident on a surface of the first projection lens of the light that is emitted from the semiconductor light source can pass through the opening in the first reflector.

7. The vehicle lamp unit according to claim 1, further comprising a third shading shutter configured to block a portion of light emitted from the semiconductor light source, the third shading shutter being disposed between the semiconductor light source and the first reflector, wherein a focal point of the first projection lens is located substantially at an upper end edge of the third shading shutter.

8. A vehicle lamp unit comprising a plurality of the vehicle lamp units according to claim 7, wherein focal lengths of the first projection lenses of the vehicle lamp units differ from each other, and optical axes of the vehicle lamp units are configured such that luminous intensity distribution patterns projected from the first projection lenses overlap each other.

9. A vehicle lamp unit configured for use with a vehicle and having an optical axis extending in a forward direction, comprising:

a semiconductor light source configured to emit light;

a first reflector having a reflecting surface configured to reflect light emitted from the semiconductor light source, the first reflector being disposed in front of a light emitting surface of the semiconductor light source while the reflecting surface is in opposition to the light emitting surface of the semiconductor light source, the first reflector having an opening formed at a position on the optical axis to allow passage of light emitted from the semiconductor light source, and the first reflector configured to substantially cover the semiconductor light source;

a second reflector having reflecting surfaces respectively disposed on opposing sides of the semiconductor light source;

a first projection lens disposed in front of the opening of the first reflector and spaced from, so as not to contact with, the first reflector, the first projection lens being configured to project light passing through the opening of the first reflector in the forward direction, wherein the reflecting surface of the first reflector is configured to reflect, toward each of the reflecting surfaces of the second reflector, portions of light emitted from the semiconductor light source that does not pass through the opening of the first reflector, and the reflecting surfaces of the second reflector are configured to reflect light that is already reflected by the reflecting surface of the first reflector into the forward direction;

a projection lens attachment leg having one end connected to the first projection lens and an other end connected to the first reflector such that the first projection lens is located in front of the opening of the first reflector in a spaced manner so as not to contact the first reflector, and the projection lens attachment leg being configured of a substantially transparent material; and a light emitting device configured to emit a second light, the light emitting device being connected to the projection lens attachment leg such that the second light transmits from the light emitting device through the projection lens attachment leg in the forward direction and a substantial portion of the second light emits from a surface of the projection lens attachment leg that substantially faces in the forward direction.

10. The vehicle of claim 9, wherein the reflecting surface of the first reflector faces towards the semiconductor light source and is configured to reflect light emitted from the semiconductor light source in a direction opposed to the forward direction;

the reflecting surfaces of the second reflector faces substantially in the forward direction and is configured to reflect light received from the first reflector towards the forward direction, and the first projection lens disposed in the optical axis of the lamp unit is configured to project light emitted from the semiconductor light source which has passed through the opening of the first reflector into the forward direction.

11. The vehicle lamp unit according to claim 9, wherein the reflecting surface of the first reflector includes a pair of ellipsoidal reflecting surfaces disposed adjacent to each other, the reflecting surfaces of the second reflector include paraboloidal reflecting surfaces respectively disposed on opposing sides of the semiconductor light source, one of the ellipsoidal reflecting surfaces has a first focal point located substantially at the semiconductor light source and has a second focal point located substantially at a focal point of one of the paraboloidal reflecting surfaces, and an other one of the ellipsoidal reflecting surfaces has a first focal point located substantially at the semiconductor light source and has a second focal point located substantially at a focal point of an other one of the paraboloidal reflecting surfaces.

12. The vehicle lamp unit according to claim 9, wherein the reflecting surface of the first reflector includes a pair of ellipsoidal reflecting surfaces disposed adjacent to each other, the reflecting surfaces of the second reflector include flat reflecting surfaces respectively disposed on opposing sides of the semiconductor light source, the vehicle lamp unit further includes second projection lenses respectively disposed in front of the flat reflecting surfaces, one of the ellipsoidal reflecting surfaces has a first focal point located substantially at the semiconductor light source and has a second focal point located substantially at a focal point of one of the second projection lenses disposed in front of a respective one of the flat reflecting surfaces, and an other one of the ellipsoidal reflecting surfaces has a first focal point located substantially at the semiconductor light source and has a second focal point located substantially at a focal point of an other one the second projection lenses disposed in front of a respective other one of the flat reflecting surfaces.

13. A vehicle lamp unit configured to emit light along an optical axis extending in a forward direction, comprising:

a semiconductor light source configured to emit light;

a first reflector having a reflecting surface facing towards the semiconductor light source and configured to reflect light emitted from the semiconductor light source in a direction opposed to the forward direction, the first reflector having an opening formed at a position on the optical axis to allow passage of light emitted from the semiconductor light source;

a second reflector having reflecting surfaces facing substantially in the forward direction and configured to reflect light received from the first reflector towards the forward direction; and a first projection lens disposed in the optical axis of the lamp unit and in front of the opening of the first reflector, the first projection lens being spaced from so as not to contact with the first reflector, the first projection lens being configured to project light emitted from the semiconductor light source which has passed through the opening of the first reflector into the forward direction, wherein the reflecting surface of the first reflector is configured to reflect, toward each of the reflecting surfaces of the second reflector, portions of light emitted from the semiconductor light source that do not pass through the opening of the first reflector, and the reflecting surfaces of the second reflector are configured to reflect light that is already reflected by the reflecting surface of the first reflector into the forward direction, wherein the reflecting surface of the first reflector includes a pair of ellipsoidal reflecting surfaces disposed adjacent to each other, the reflecting surfaces of the second reflector include paraboloidal reflecting surfaces respectively disposed on opposing sides of the semiconductor light source, one of the ellipsoidal reflecting surfaces has a first focal point located substantially at the semiconductor light source and has a second focal point located substantially at a focal point of one of the paraboloidal reflecting surfaces, and an other one of the ellipsoidal reflecting surfaces has a first focal point located substantially at the semiconductor light source and has a second focal point located substantially at a focal point of an other one of the paraboloidal reflecting surfaces;

a first shading shutter having a light incident surface facing the optical axis of the lamp unit, the light incident surface configured to have a portion of light emitted from the semiconductor light source and reflected by the first reflector be incident on the light incident surface; and a second shading shutter having a second shutter light incident surface facing the optical axis of the lamp unit, the second shutter light incident surface configured to have a portion of light emitted from the semiconductor light source and reflected by the first reflector be incident on the second shutter light incident surface, wherein the second focal point of the one of the ellipsoidal reflecting surfaces is located substantially at an upper end edge of the first shading shutter, and the second focal point of the other one of the ellipsoidal reflecting surfaces is located substantially at an upper end edge of the second shading shutter.

* * * * *